United States Patent
Harnett

(10) Patent No.: US 8,648,734 B2
(45) Date of Patent: Feb. 11, 2014

(54) SYSTEM AND METHOD FOR COLLECTING DATA USING WIRED SENSORS CONNECTED TO WIRELESS NODES

(75) Inventor: Cindy K. Harnett, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 644 days.

(21) Appl. No.: 12/676,450

(22) PCT Filed: Sep. 12, 2008

(86) PCT No.: PCT/US2008/076154
§ 371 (c)(1),
(2), (4) Date: Mar. 4, 2010

(87) PCT Pub. No.: WO2009/036262
PCT Pub. Date: Mar. 19, 2009

(65) Prior Publication Data
US 2010/0201542 A1    Aug. 12, 2010

Related U.S. Application Data

(60) Provisional application No. 60/972,044, filed on Sep. 13, 2007.

(51) Int. Cl.
*G08C 17/00* (2006.01)
*G08C 19/12* (2006.01)

(52) U.S. Cl.
USPC ................................ 340/870.28; 340/870.01

(58) Field of Classification Search
USPC .............. 340/870.28, 870.01, 870.02, 870.21
See application file for complete search history.

(56) References Cited

U.S. PATENT DOCUMENTS

| | | | |
|---|---|---|---|
| 7,675,410 B2* | 3/2010 | Aritsuka et al. | 340/539.1 |
| 2006/0224619 A1* | 10/2006 | Kang et al. | 707/103 X |
| 2007/0115116 A1* | 5/2007 | Zabek | 340/539.22 |
| 2007/0262863 A1* | 11/2007 | Aritsuka et al. | 340/539.22 |
| 2008/0273486 A1* | 11/2008 | Pratt et al. | 370/328 |
| 2009/0046610 A1* | 2/2009 | Yamaji | 370/311 |
| 2009/0185542 A1* | 7/2009 | Zhang et al. | 370/338 |
| 2011/0285516 A1* | 11/2011 | Ritter | 340/286.02 |
| 2012/0068822 A1* | 3/2012 | Sheikman et al. | 340/7.2 |

OTHER PUBLICATIONS

Harman RM, "Wireless Solutions for Aircraft Condition Based Maintenance Systems," Aerospace Conference Proceedings, 2002, IEEE, vol. 6, pp. 2877-2886.

(Continued)

*Primary Examiner* — Peguy Jean Pierre
(74) *Attorney, Agent, or Firm* — Stites & Harbison PLLC; Jeffrey A. Haeberlin

(57) ABSTRACT

A system for collecting data includes a remote sensor assembly and a central data collection device. The remote sensor assembly has a data bus, a remote wireless node, and a plurality of remote sensor modules in wired communication with the remote wireless node via the data bus. Each of the remote sensor modules converts a sensed condition into data in response to a request from the remote wireless node. The central data collection device has a master wireless node for periodically wirelessly communicating with the remote wireless node. The remote wireless node collects data from each of the plurality of remote sensor modules and periodically transmits the data to the master wireless node. The remote sensor modules are interchangeable and new remote sensor modules may be added. The remote wireless node may detect the sequence of the attached remote sensor modules to enable three-dimensional mapping of the sensed conditions.

16 Claims, 5 Drawing Sheets

(56) References Cited

OTHER PUBLICATIONS

Xiaoyong et al., "RFID Based General Wireless Sensor Interface. Wireless Internet for the Mobile Enterprise Consortium," Technical Report/White Paper, UCLA-WINMED-2003-201 RFID-SENSOR, Nov. 2003.

Harnett CK, "Determining the Physical Sequence of Sensors on a Serial Bus with Minimal Wiring," IEEE Sensors Journal, vol. 8(4), 2008, pp. 382-383.

Harnett et al., "SALAMANDER: A Distributed Sensor System for Aquatic Environmental Measurements," IEEE International Instrumentation and Measurement Technology Conference, Victoria, Vancouver Island, Canada. May 12-15, 2008.

* cited by examiner

SYSTEM AND METHOD FOR COLLECTING DATA USING WIRED SENSORS CONNECTED TO WIRELESS NODES

CROSS-REFERENCE TO RELATED APPLICATIONS

This application claims the benefit of U.S. Provisional Patent Application No. 60/972,044, filed Sep. 13, 2007, the entire disclosure of which is hereby incorporated by reference.

STATEMENT REGARDING FEDERALLY SPONSORED RESEARCH OR DEVELOPMENT

The presently disclosed subject matter was made with support from the U.S. Government under Grant Number 0644511 awarded by the National Science Foundation. Thus, the U.S. Government has certain rights in the presently disclosed subject matter.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to collecting data using wired sensors connected to wireless nodes. More particularly, the invention relates to systems and methods for collecting data from wired sensors communicating with a wireless node via a data bus, the wireless node wirelessly communicating with a central data collection device.

2. Background

Much wireless sensor network research focuses on automated node location, particularly for three-dimensional mapping of environmental conditions in situations where it is impractical for users to manually enter fixed node locations, or where the nodes move through the environment over time. However, the environments to be monitored often include freshwater, seawater, or moist soil—conductive media in which radio waves are severely attenuated.

Wired sensor networks using permanently connected sensors at fixed locations do not have the attenuation problems associated with wireless sensor networks. Further, wired sensor networks enable data mapping. However, such wired sensor networks do not provide for movement of the sensors through the environment or allow easily changing the order of sensors in the network. With respect to changing the order of sensors in a wired network, current methods for automatically determining sensor sequence require addition of two or more extra wire connections. For example, "Chain Mode" thermometer chips have an additional pair of pins that provide an input and output for each chip to be connected in series, enabling sequence detection with five wires. Another method allows seven pins on the chip to be either floated or grounded, and the resulting configuration reported on a data line. With these chips, it would be possible to make 128 unique connectors which would provide a telltale physical address for sensors depending on their location along the network. Ten wires would be needed to take full advantage of this method for sequence detection. However, installing connectors for individual wires is a time-consuming process when assembling new hardware. Further, in humid environments, such as a waterborne environmental sensor network, each additional make-or-break connection increases the risk of failure due to contact corrosion.

Still further, wireless and wired sensor networks generally require manually programming of calibration coefficients, methods of operation and similar information for newly developed sensors, which makes adding newly developed sensors to existing networks problematic.

BRIEF SUMMARY OF THE INVENTION

Accordingly, the present invention is directed to a system and method for collecting data using wired sensors connected to wireless nodes.

According to one aspect of the invention, a system for collecting data includes a remote sensor assembly and a central data collection device. The remote sensor assembly has a data bus, a remote wireless node, and a plurality of remote sensor modules in wired communication with the remote wireless node via the data bus. Each of the plurality of remote sensor modules converts a sensed condition into data in response to a request from the remote wireless node. The central data collection device has a master wireless node for periodically wirelessly communicating with the remote wireless node. The remote wireless node collects data from each of the plurality of remote sensor modules and periodically transmits the data to the master wireless node for storage by the central data collection device.

In accordance with an exemplary embodiment of the system, each of the plurality of remote sensor modules has a unique serial number. The remote wireless node periodically determines the unique serial number of each of the plurality of remote sensor modules in wired communication with the remote wireless node via the data bus.

In accordance with another exemplary embodiment, the data bus is a one-wire serial bus. Each of the plurality of remote sensor modules includes a detector that provides an analog signal representing the sensed condition, and an analog-to-digital (A/D) converter that converts the analog signal to a one-wire digital signal for communicating over the one-wire serial bus.

In accordance with another exemplary embodiment, each of the plurality of remote sensor modules further includes a local memory containing operating information. The remote wireless node retrieves the operating information from the local memory.

In accordance with yet another exemplary embodiment, the remote wireless node includes a local database that relates operating information for operating each of the plurality of remote sensor modules to serial numbers corresponding to the unique serial number for each of the plurality of remote sensor modules.

In accordance with a further exemplary embodiment, the system further includes a remote database in communication with the central data collection device over a network. The remote database also relates operating information for operating each of the plurality of remote sensor modules to serial numbers corresponding to the unique serial number for each of the plurality of remote sensor modules. The remote wireless node retrieves operating information for each of the plurality of remote sensor modules from the remote database and stores the operating information to the local database.

In accordance with still further exemplary embodiments, the remote sensor assembly further includes a power bus having a power line and a ground line in parallel with the one-wire serial bus. Each of the plurality of remote sensor modules is interchangeably connected to the one-wire serial bus and the power bus at respective spaced sensor attachment points. An inductor may be included in the power line between each of the sensor attachment points, and a powered oscillator base circuit may be in contact with the power line near a remote wireless node end of the power bus. Each of the plurality of remote sensor modules may have a capacitor between the power line and a switch. The remote wireless node may then sequentially detect a resonant frequency resulting from switching each respective capacitor to ground, and determine a physical sequence of the plurality of remote sensor modules along the one-wire serial bus using the resonant frequencies.

According to another aspect of the invention, a method for collecting data includes the steps of: polling a plurality of wired sensors connected to each other via a data bus to obtain data representing a sensed condition at each of the plurality of wired sensors; and periodically sending the data to a central data collection device via a wireless connection.

In accordance with an exemplary embodiment, the method of further includes determining a unique serial number for each of the plurality of wired sensors.

In accordance with another exemplary embodiment, the method still further includes periodically determining if any new wired sensors have been added to the plurality of wired sensors connected to the data bus.

In accordance with yet another exemplary embodiment, each of the plurality of wired sensors includes a local memory containing operating information, and the method includes retrieving the operating information from the local memory of each of the plurality of wired sensors.

In accordance with an alternate exemplary embodiment, the method further includes retrieving operating information for each of the plurality of wired sensors from a database using the unique serial number for each of the plurality of wired sensors. The database may be a remote database, in which case the method further includes retrieving the operating information from the remote database and storing the operating information in the local database.

In accordance with yet another exemplary embodiment, the data bus is a one-wire serial bus. Additionally, a power line and a ground line form a power bus parallel to the one-wire serial bus. Each of the plurality of wired sensors is interchangeably connected to the one-wire serial bus and the power bus at respective spaced sensor attachment points. Further, the power line has an inductor between each of the sensor attachment points, and a powered oscillator base circuit is in contact with the power line near a remote wireless node end of the power bus. With this configuration of elements, the method further includes determining a physical sequence of the plurality of wired sensors by sequentially detecting a resonant frequency resulting from switching a switch on each of the plurality of wired sensors to connect a capacitor between the power line and the ground line. The method may still further include sending the physical sequence of each of the plurality of wired sensors to the central data collection device to enable mapping a location of each of the plurality of wired sensors in three-dimensions.

It is to be understood that both the forgoing general description and the following detailed description are exemplary and explanatory only, and are not restrictive of the invention as claimed. The accompanying drawings illustrate exemplary embodiments of the invention and, together with the description, serve to explain principles of the invention. Other features and advantages of the invention will be set forth in, or apparent from, the detailed description of exemplary embodiments of the invention found below.

BRIEF DESCRIPTION OF THE SEVERAL VIEWS OF THE DRAWINGS

These and other features, aspects, and advantages of the present invention will become better understood with regard to the following description, appended claims, and accompanying drawings where:

DETAILED DESCRIPTION OF EXEMPLARY EMBODIMENTS OF THE INVENTION

Figure 1:
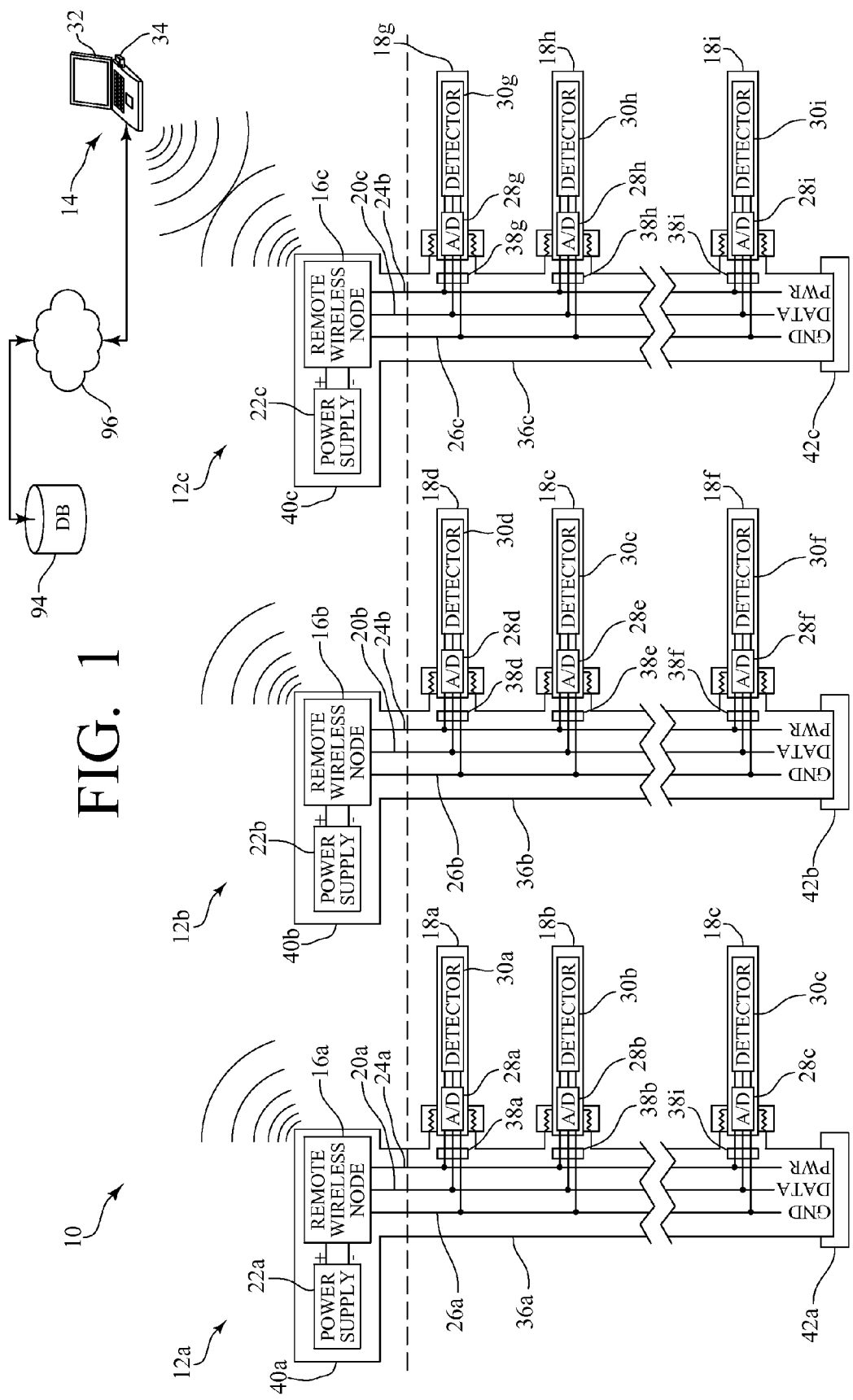
FIG. 1 is a functional block diagram of a system for collecting data according to an exemplary embodiment of the invention.

FIG. 1 shows an exemplary system 10 for collecting data including several remote sensor assemblies 12a, 12b, 12c and a central data collection device 14. The remote sensor assemblies 12a, 12b, 12c have corresponding remote wireless nodes 16a, 16b, 16c and a plurality of remote sensor modules 18a-18i in communication with the remote wireless nodes 16a, 16b, 16c over respective data buses 20a, 20b, 20c. Preferably, the data buses 20a, 20b, 20c are one-wire serial buses.

Also shown are respective power supplies 22a, 22b, 22c. The power supplies 22a, 22b, 22c supply power to the remote wireless nodes 16a, 16b, 16c and to the remote sensors 18a-18i via the remote wireless nodes 16a, 16b, 16c. Respective power lines 24a, 24b, 24c and ground lines 26a, 26b, 26c form power buses from the remote wireless nodes 16a, 16b, 16c to the remote sensor modules 18a-18i.

The remote sensor modules 18a-18i have respective analog-to-digital (A/D) converters 28a-28i that convert analog signals from detectors 30a-30i into digital data for the remote wireless nodes 16a, 16b, 16c. Each of the plurality of remote sensor modules 18a-18i has a unique serial number. Preferably, the A/D converters 28a-28i convert the analog signals to one-wire digital signals for communicating over one-wire serial buses.

The central data collection device 14 has a computing device 32 and a master wireless node 34. The remote wireless node 16 collects data from the plurality of remote sensors modules 18a-18i and periodically transmits the data to the master wireless node 34 for storage by the computing device 32.

Figure 2:
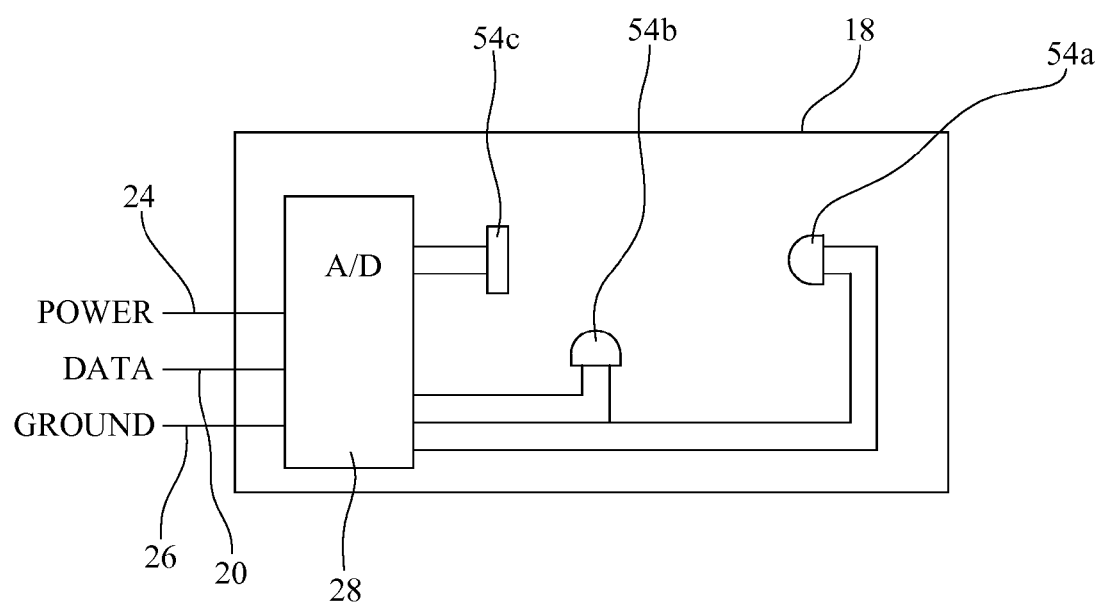
FIG. 2 is a schematic diagram of an exemplary remote sensor module of the system of FIG. 1.

FIG. 2 shows an exemplary remote sensor module 18 having an A/D converter 28 and sensor elements 54a, 54b, 54c. In the exemplary remote sensor module 18, the A/D converter 28 contains the unique serial number (i.e., a "ROM code") for the remote sensor module 18, and is individually addressable by a remote wireless node (e.g., remote wireless nodes 16a, 16b, 16c (FIG. 1)). The A/D converter 28 does not transmit data until the remote wireless node selects the A/D converter 28 over the data bus 20. The A/D converter 28 is also capable of receiving instructions from the remote wireless node 16 and switching power to the sensor elements 54a-54c on and off. An exemplary A/D converter 28 is a 1-Wire™ Quad A/D Converter, part number DS2450 manufactured by Maxim Integrated Products, Inc. of Sunnyvale, Calif.

The exemplary remote sensor 18 shown in FIG. 2 is a turbidity sensor having a first LED 54a, a second LED 54b and an optical sensor 54c. The first LED 54a is positioned facing the optical sensor 54c and about 2 cm from the optical sensor 54c, allowing a fluid, such as water in a stream, to pass between the first LED 54a and the optical sensor 54c. The first LED 54a is useful in determining the absorption of emitted light by the fluid. The second LED 54b is positioned adjacent and at about a 90 degree angle to the optical sensor 54c. The second LED 54b is useful in determining reflection of emitted light by the fluid. In use, a baseline reading is taken with neither the first LED 54a nor the second LED 54b turned on. Absorption is measured by turning the first LED 54a on and the second LED 54b off. Reflection is measured by turning the first LED 54a off and the second LED 54b on.

In the exemplary embodiment, the first LED 54a and the second LED 54b transmit light having a wavelength of approximately 660 nm (red), which are matched to the sensor 54c. The output of the optical sensor 54c is 0 to 5V proportional to the light intensity. The remote wireless node 16 (FIG. 1) sends instructions sent to the A/D converter 28 by sending the unique address of the A/D converter 28 followed by two bytes of data.

Figure 3:
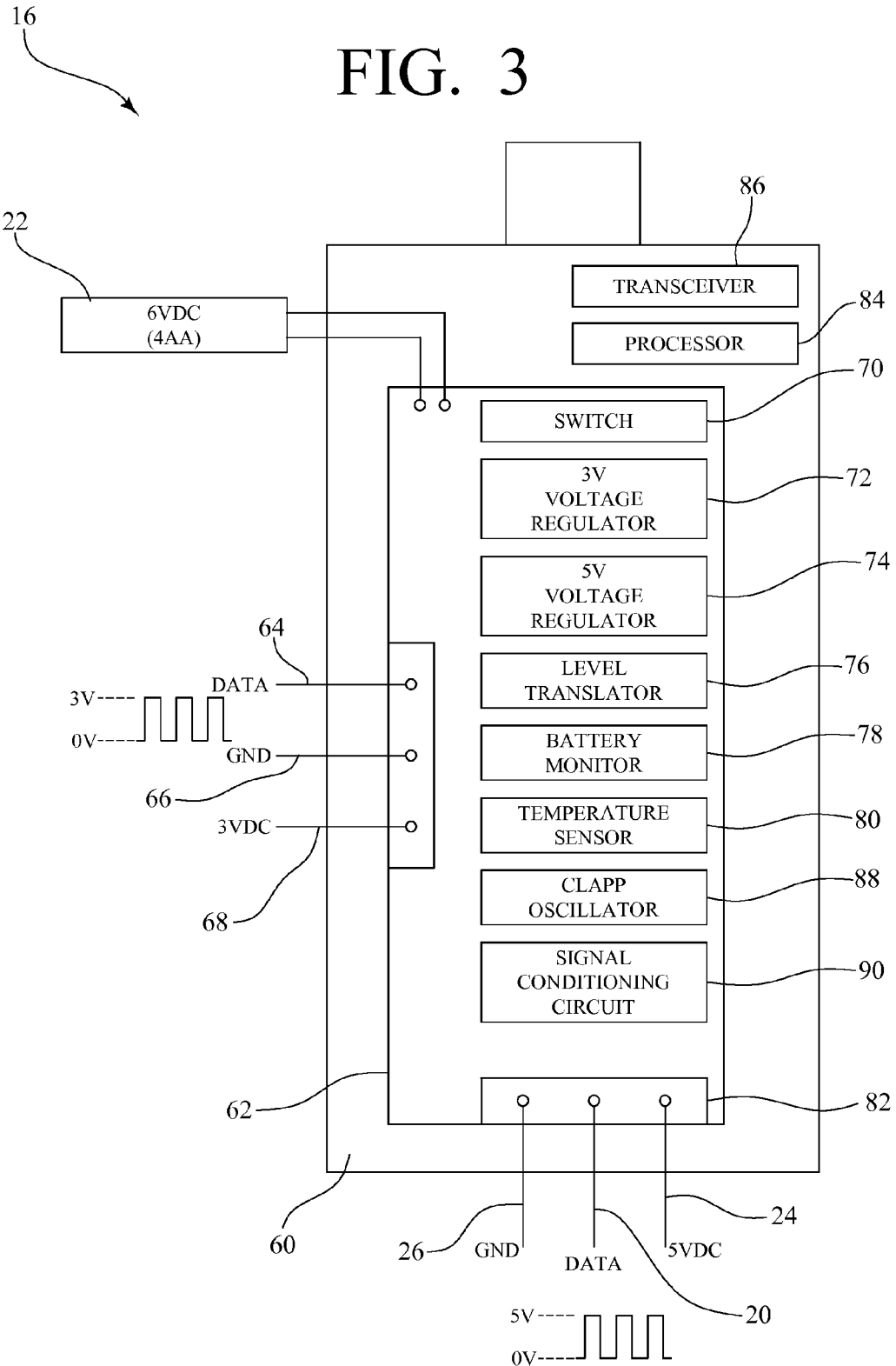
FIG. 3 is a schematic diagram of an exemplary remote wireless node of the system of FIG. 1.

FIG. 3 shows an exemplary remote wireless node 16 having a transceiver board 60 and a power board 62. The power board 62 sits on top of the transceiver board 60, and is interfaced to the transceiver board 60 via a data line 64, a ground line 66 and a power line 68. In the exemplary remote wireless node 16, the power board 62 is required because the exemplary transceiver board 60 operates on a 0-3.3 VDC operating range, while the remote sensor modules 18a-18i (FIG. 1) operate on a 0-5 VDC operating range.

The exemplary power board 62 takes a 6 VDC power supply (e.g., power supply 22 (FIG. 1)) (preferably 4 AA batteries), and provides 3 VDC for the transceiver board 60, and 5 VDC for the remote sensors (FIG. 1). Additionally, the exemplary power board 62 includes a data signal level translator 76 that translates data signals between the 0-3 VDC data signals of the transceiver board 60 and the 0-5 VDC data signals of the remote sensor modules 18a-18i (FIG. 1). Still further, the exemplary power board 62 includes a power switch 70, a 3-volt regulator 72, a 5-volt regulator 74, a battery monitor 78, and a temperature sensor 80. The exemplary power board 62 also includes a remote sensor interface 82, including the data bus 20, the ground line 26, and the power line 24, discussed above. Still further, the exemplary power board 62 also includes an oscillator base circuit 88 and a signal conditioning circuit 90, described in more detail below.

The exemplary transceiver board 60 includes a microcontroller 84 and a wireless transceiver 86. The microcontroller 84 communicates with the remote sensor modules 18a-18i (FIG. 1) using a one-wire data protocol. Also, the wireless transceiver 86 may be, for example, an 802.15.4 ("Zigbee") protocol transceiver for wirelessly communicating with the central data collection device 14. An antenna (not shown) is located on the transceiver board 60. The microcontroller 84 includes a memory which stores software for operation of the remote wireless node 16 and the remote sensor modules 18a-18i (FIG. 1).

In operation, the remote wireless node 16 first determines which remote sensor modules (e.g., remote sensor modules 18a-18i (FIG. 1)) are in wired communication with the remote wireless node 16 via a data bus (e.g., data buses 20a, 20b, 20c (FIG. 1)). This is accomplished either by polling a list of possible remote sensor modules 18a-18i (FIG. 1) by serial numbers stored in the memory of the microcontroller 84, or by using a "Search ROM" function which can efficiently discover the addresses of any attached A/D converters 28a-28i. Preferably, the remote sensor modules 18a-18i are interchangeably connected to the data bus (e.g., data buses 20a, 20b, 20c (FIG. 1)). Thus, the remote wireless node 16 periodically re-determines which of the plurality of remote sensor modules 18a-18i (FIG. 1) are in wired communication with the remote wireless node 16 via a data bus (e.g., data buses 20a, 20b, 20c (FIG. 1)) to detect the addition or removal of remote sensor modules 18a-18i (FIG. 1).

Once it is determined which of the plurality of remote sensor modules 18a-18i (FIG. 1) are in wired communication with the remote wireless node 16, operating information for each of the connected remote sensor modules 18a-18i (FIG. 1) is obtained from one of several possible sources, described in more detail below. Operating information for each of the remote sensor modules 18a-18i (FIG. 1) may include origin, type, calibration coefficients, method of operation, and similar information.

In one embodiment, each of the plurality of remote sensor modules 18a-18i (FIG. 1) includes a local memory, such as an EEPROM of approximately one kB or greater, containing operating information. Thus, the remote wireless node 16 can obtain the operating information directly from each of the plurality of remote sensor modules 18a-18i (FIG. 1).

In another embodiment, the memory of the microcontroller 84 of the transceiver board 60 may include a local database that relates the unique serial numbers of the remote sensor modules 18a-18i (FIG. 1) to operating information for each of the remote sensor modules 18a-18i (FIG. 1). To allow for the addition of new remote sensor modules to the system 10 (FIG. 1), including new types of remote sensor modules, the central data collection device 12 (FIG. 1) may be in communication with a remote database 94 (FIG. 1) over a network 96 (FIG. 1), such as the Internet. The remote database 94 also relates the unique serial numbers of the remote sensor modules 18a-18i to operating information for each of the remote sensor modules 18a-18i, and is updatable for adding operating information for new remote sensor modules. Thus, the remote wireless node 16 may retrieve operating information for each of the remote sensor modules 18a-18i from the remote database 94 via the central data collection device 12, and store the operating information to the local database of the memory of the microcontroller 84 for independent operation of the remote wireless node 16.

Additionally, the remote sensor assemblies 12a, 12b, 12c (FIG. 1) may further include components to enable the remote wireless node 16 to determine the actual physical position and sequence of the remote sensors 18a-18i. The exemplary sequence detection assembly described here uses the power line 24 to construct an oscillator circuit with frequency dependent upon the sequence of the remote sensor modules (e.g., remote sensor modules 18a-18i (FIG. 1)). After sequence detection is complete, the power line 24 fulfills its normal 5V DC operation.

Figure 4:
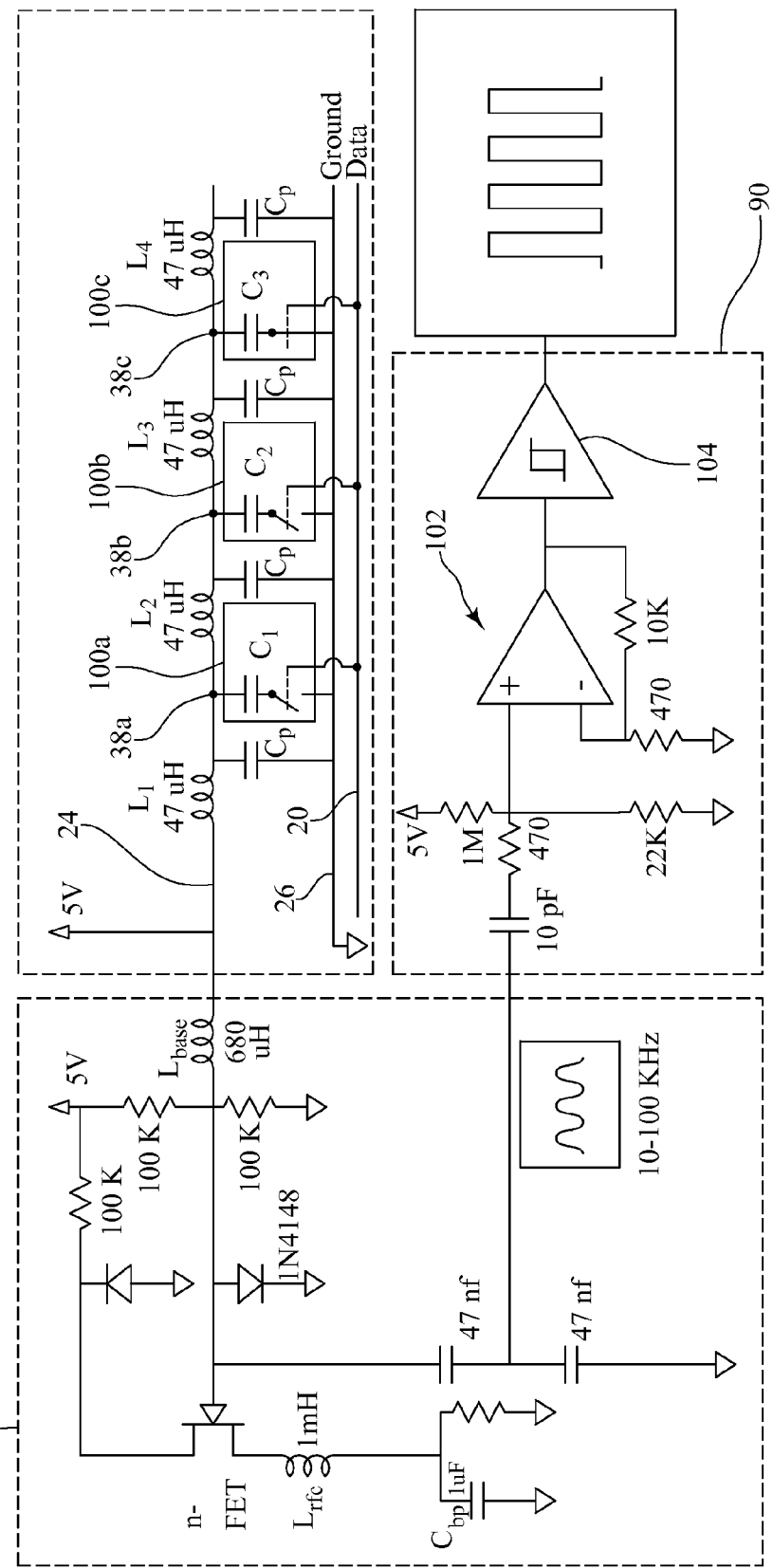
FIG. 4 is a circuit diagram of an exemplary sequence detection assembly of the system of FIG. 1.

As shown in FIG. 4, the exemplary sequence detection assembly relies on inserting inductors L1-L3 in the power line 24 between each of the sensor attachment points 38a, 38b, 38c. Provided the inductors L1-L3 have low resistance, normal DC operation will not be affected because the inductor will merely act as a long wire. Likewise, capacitors C1-C3 are installed between the power line 24 and the ground line 26 will not disturb DC operation. Addressable switches 100a, 100b, 100c are connected as switches addressed through the data bus 20.

During sequence detection, the oscillator base circuit 88 is powered, and the ground line 26 and data bus 20 are used to switch one of the capacitors C1-C3 to ground on one of the addressable switches 100a, 100b, 100c. If the nth chip's capacitor Cn is grounded, this puts n inductors (L1 through Ln) in series with one capacitor Cn, completing an oscillator circuit comprising the oscillator base circuit 88, the n inductors and the capacitor Cn, and determining the resonant frequency of the oscillator circuit (e.g., a Clapp oscillator).

Figure 5:
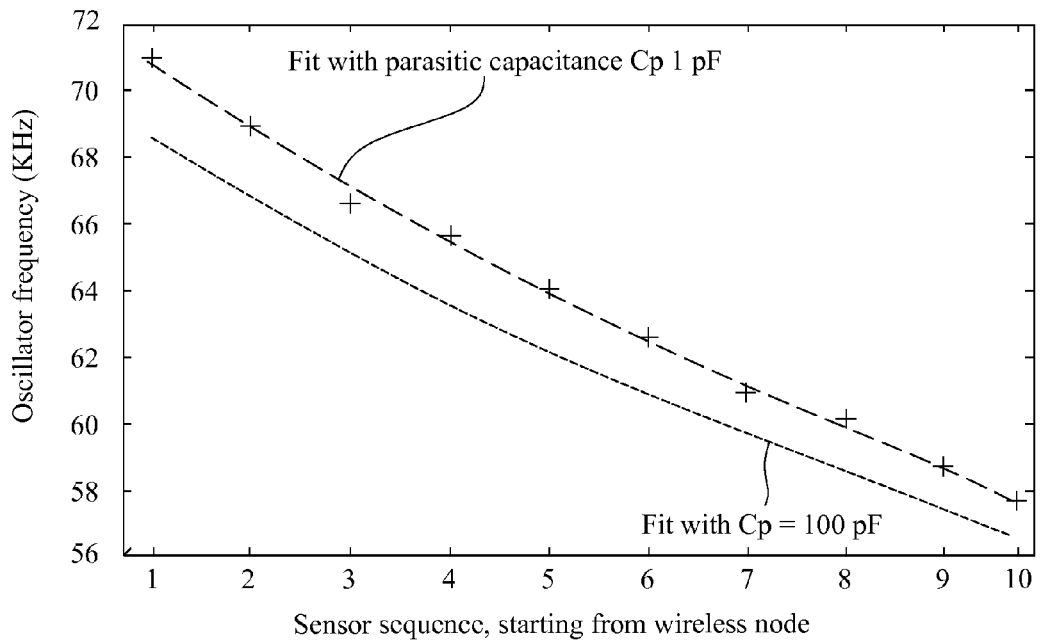
FIG. 5 is a diagram of oscillator frequency versus remote sensor module sequence using the sequence detection assembly of FIG. 4.

As shown in FIG. 5, the resonant frequency of the oscillator decreases as the number of inductors L1-Ln between the switched capacitor Cn and the oscillator base circuit 88 increases.

For capacitor switching, addressable switches 100a, 100b, 100c must be used that do not require 5V power. Fortunately, several "parasite-powered" addressable switch chips can operate switches in parasite mode. Such chips obtain power from the data line, and, advantageously, also can store relevant data such as sensor calibration coefficients.

FIG. 4 also shows the signal conditioning circuit 90, which consists of an amplifier circuit 102 and a Schmitt trigger 104. The signal conditioning circuit 90 converts a sinewave input from the oscillator circuit into a square pulse train easily monitored by one input pin of the microcontroller 84 (FIG. 3). The microcontroller 84 counts the oscillator frequency associated with each discovered remote sensor module (e.g., remote sensor modules 18a-18i (FIG. 1)), sorting the IDs in order of decreasing frequency. The resulting list corresponds to physical sequence of the discovered remote sensor modules (e.g., remote sensor modules 18a-18i (FIG. 1)). For normal operation, the oscillator base circuit 88 is powered off, and the power line 24 carries 5V DC to provide power to the discovered remote sensor modules (e.g., remote sensor modules 18a-18i (FIG. 1)).

FIG. 4 illustrates the situation wherein the third one-wire chip 100c switches the third capacitor C3 to the ground line 26. Three inductors L1-L3 are connected in series with the third capacitor C3.

Generally, the oscillator frequency depends on $1/\sqrt{n}$ where n is the chip's position starting with 1 for the chip nearest the remote wireless node 16. During the sequence detect function, the remote wireless node 16 counts the oscillator frequency associated with each addressable switch 100a-100c address, and sorts the addresses in order of decreasing frequency. The resulting list corresponds to physical sensor sequence. Rather than the absolute frequency, the relative frequency is used in this method—making it robust in the face of temperature-induced frequency shifts or the effects of parasitic capacitance and inductance.

Returning now to FIG. 1, according to an exemplary embodiment, the system 10 is used for environmental research for studies of water quality and sediment transport in streams. In such an application, the structure of the remote sensor assemblies 12a, 12b, 12c includes respective pipes 36a, 36b, 36c, such as PVC pipes, configured with multiple sensor attachment points 38a-38i positioned in a spaced configuration along the pipes 36a, 36b, 36c. The remote wireless nodes 16a, 16b, 16c and the power supplies 22a, 22b, 22c (preferably battery packs) are received in respective waterproof housings 40a, 40b, 40c that are positioned at the top of the pipes 36a, 36b, 36c. The bottom of the pipes 36a, 36b, 36c are sealed with respective pipe caps 42a, 42b, 42c.

The remote sensor modules 18a-18i are preferably built onto circuit boards for sensing various environmental conditions in the stream, such as turbidity, flow, temperature and pressure. The circuit boards are each inserted into a threaded connector, and sealed such that wiring from each circuit board is sealed on a "dry-side" of the connector and the remaining portion of each circuit board protrudes from a "wet-side" of the connector. The portion of each circuit board that protrudes from the "wet side" of the connector is preferably coated by vapor deposit with a Parylene waterproof coating, or the like. Preferably, the remote sensor modules 18a-18i have wiring connectors for connection to mating wiring connectors connected to the ground lines 26a, 26b, 26c, power lines 24a, 24b, 24c and one-wire serial buses 20a, 20b, 20c at each of the sensor attachment points 38a-38i. Collars are used to seal the remote sensor modules 18a-18i to the pipes 36a, 36b, 36c at the sensor attachment points 38a-38i without having to rotate the remote sensor modules 18a-18i or twist the wiring. Thus, the remote sensor modules 18a-18i may be easily and interchangeably attached to the pipes 36a, 36b, 36c at any desired sensor attachment point 38a-38i to form a water-tight seal. Multiple remote sensing modules 12a, 12b, 12c are deployed across a stream, in order to obtain a "snapshot" of environmental conditions in the stream. The remote wireless nodes 16a, 16b, 16c are held above the water by the pipes 36a, 36b, 36c. This configuration facilitates efficient transmission of the wireless signals which propagate substantially better through air than through water.

Advantageously, if one of the remote sensor modules 18a-18i is not needed at one of the sensor attachment points 38a-38i, the unneeded remote sensor module 18a-18i can be removed from the respective remote sensor assembly 12a, 12b, 12c and the pipe (e.g., pipes 36a, 36b, 36c) sealed off without any effect on the operation of the system. Thus, irrelevant sensors can be removed so that power and bandwidth are not wasted on unnecessary devices.

Other remote wireless sensors include (not shown): flow (printed resistor having characteristics where bends caused by flow change resistance), temperature, and pressure sensors. Additionally, custom microelectromechanical systems (MEMS) and nanomaterial-based sensors can be incorporated into the system 10 by providing a 0-5V analog output, a set of calibration coefficients, and electrical contacts to power the sensor on and off.

From the addresses of the connected remote sensor modules 18a-18i, the remote wireless nodes 16a, 16b, 16c are able to look-up the sensor type (turbidity, temperature, pressure, flow, etc.). The remote wireless nodes 16a, 16b, 16c can then access specific instructions for each sensor type. For instance, the remote wireless nodes 16a, 16b, 16c can instruct a turbidity sensor to turn on a first LED, get data for the first LED, send the data, and then turn the first LED off.

The subroutines specific to each of the remote sensor modules 18a-18i operate their respective sensors to generate data, and then collect the data generated. With respect to each of the remote sensor modules 18a-18i, the steps include: send the ID of the sensor to initiate communication with the sensor, turn the sensor "on," collect data, put results in a data collection table, and then turn the sensor "off." Of course, each of the specific subroutines will include sensor specific instructions for operating the sensor to collect data.

Once data is collected for the remote sensor modules 18a-18i, the remote wireless nodes 16a, 16b, 16c will transmit the data in packets that include the packet number, node number, a time stamp, the address of the sensor, and the sensor data.

The master wireless node 34 receives transmissions from the remote wireless nodes 16a, 16b, 16c. Data storage and communications are managed by the computing device 32, which is preferably a computer, such as a laptop computer, a PDA-type computer, or a single-board computer with an ARM processor.

When data from the remote sensors 18a-18i is received, the central data collection device 14 determines the sensor type and calibration data for each sensor, and converts the received data into an associated environmental value, such as turbidity, temperature, pressure or flow. However, as an alternative, it should be noted that the conversion to environmental values could be performed by the remote wireless nodes 16a, 16b, 16c. As data is received from the remote wireless nodes 16a, 16b, 16c, the received data is preferably written to a text file.

Power for the central data collection device 14 could be supplied by a battery or a solar panel. The central data collection device 14 could include a cellular modem for transmission of collected data.

Additionally, automated sequencing will enable immediate mapping of sensor depth, and when combined with well-known wireless node location methods, will enable real-time three-dimensional display of environmental conditions.

Figure 6:
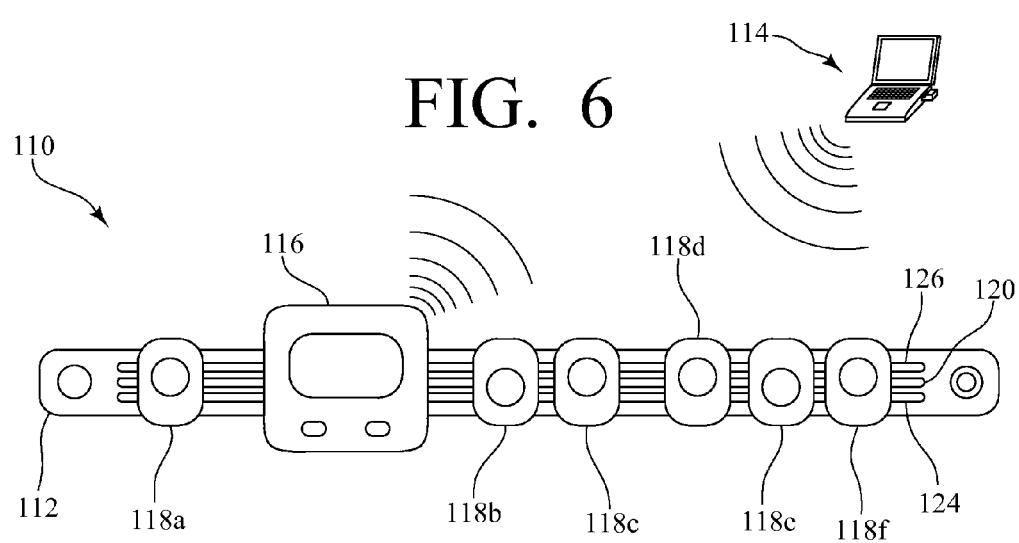
FIG. 6 is a schematic diagram of a personal information system for collecting data according to an exemplary embodiment of the invention.

In another application of the system and method for collecting data discussed above, FIG. 6 shows a personal information system 110 including a remote sensor assembly 112 and a central data collection device 114. The remote sensor assembly 112 resembles a wristwatch with a watchband. A remote wireless node 116 and power supply (not shown) are included in the wristwatch-like element. The watchband-like element includes a data bus 120, a ground line 126, and, optionally, a power line 124. Remote sensor modules 118a-118f resemble "buttons" and are attached to the watchband-like element and in communication with the data bus 120, the ground line 126 and the power line 124. It is noted that the remote sensor assembly 112 may take other configurations, such as a mobile phone also functioning as a remote wireless node, and a strap attached to a port on the mobile phone, the strap including a data bus, a ground line and a power line for interfacing to "buttons" functioning as remote sensor modules.

The "buttons" functioning as remote sensor modules may include, for example, an onboard resistive sensor for chemical sensing and other components such as tactile switches and light-emitting diodes. These miniature sensors may be built on thin flexible polymer circuit boards rather than thick fiberglass circuit boards.

In operation, the remote wireless node 116 periodically detects if any remote sensor modules (e.g., remote sensor modules 118a-118f) have been added or removed using the "Search ROM" algorithm discussed above, or the like. The remote wireless node 116 continuously polls each of the remote sensor modules 118a-118f for changes in state, such as detection of a chemical or activation of a switch. The remote wireless node 116 can also activate functions on individual remote sensor modules 118a-118f, such as turning on an LED or changing the gain of a chemical sensor. The remote wireless node 116 alerts a user to any changes through a user interface, which can be locally attached to the wired network (e.g., a small speaker or an LCD screen) or over a wireless channel to another system (e.g., a mobile phone, a laptop computer, a central database). Additionally, the remote wireless node 116 can receive software updates from the central data collection device 114.

In one application, the personal information system 110 is used by a firefighter, soldier, hospital worker or other worker in an environment with changing toxic chemical or biological agents. Each worker has a remote sensor assembly 112 to which remote sensor modules 118a-118f can be added or removed. With this modular functionality, a new sensor module can be issued to all personnel when a new threat emerges. Advantages of the personal information system 110 in this application are that the user interface does not need to be replaced for new threats, the user's own serial number stored in the remote wireless node 116 remains constant, and the remote sensor modules 118a-118f can be rapidly customized for an individual worker's environment.

In another application, the personal information system 110 consists of a remote sensor assembly 112 purchased by a user. The user attaches new remote sensor modules 118a-118f purchased or received from others. The remote sensor modules 118a-118f have few sensing capabilities beyond a button press. The remote sensor assembly 112 forms a tangible user interface for storing and retrieving an individual's contact information, web bookmarks, and the like. The remote sensor assembly 112 uses the wireless connection to communicate information to and from the central data collection device 114, which could be a laptop computer, PDA or phone. The user can use the central data collection device 114 to enter new information into local memories on the remote sensor modules 118a-118f, or to associate new information in a database with a serial number of a particular remote sensor module.

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A system for collecting data comprising:
a remote sensor assembly having a data bus, a remote wireless node, and a plurality of remote sensor modules in wired communication with the remote wireless node via the data bus, each of the plurality of remote sensor modules converting a sensed condition into data in response to a request from the remote wireless node; and
a central data collection device having a master wireless node for periodically wirelessly communicating with the remote wireless node;
wherein the remote wireless node collects data from each of the plurality of remote sensor modules and periodically transmits the data to the master wireless node for storage by the central data collection device.

2. The system of claim 1, wherein each of the plurality of remote sensor modules has a unique serial number, and wherein said remote wireless node periodically determines the unique serial number of each of the plurality of remote sensor modules in wired communication with the remote wireless node via the data bus.

3. The system of claim 2, wherein the data bus is a one-wire serial bus, wherein each of the plurality of remote sensor modules includes a detector providing an analog signal representing the sensed condition, and an analog-to-digital (A/D) converter converting the analog signal to a one-wire digital signal for communicating over the one-wire serial bus.

4. The system of claim 3, wherein each of the plurality of remote sensor modules further includes a local memory containing operating information, and wherein the remote wireless node retrieves the operating information from the local memory.

5. The system of claim 3, wherein the remote wireless node includes a local database that relates operating information for operating each of the plurality of remote sensor modules to serial numbers corresponding to the unique serial number for each of the plurality of remote sensor modules.

6. The system of claim 5, further including a remote database in communication with the central data collection device over a network, the remote database relating operating information for operating each of the plurality of remote sensor modules to serial numbers corresponding to the unique serial number for each of the plurality of remote sensor modules, wherein the remote wireless node retrieves operating information for each of the plurality of remote sensor modules from the remote database and saves the operating information in the local database.

7. The system of claim 3, wherein the remote sensor assembly further comprises a power bus having a power line and a ground line in parallel with the one-wire serial bus, wherein each of the plurality of remote sensor modules is interchangeably connected to the one-wire serial bus and the power bus at respective spaced sensor attachment points.

8. The system of claim 7, further comprising an inductor in the power line between each of the sensor attachment points, a powered oscillator base circuit in contact with the power line near a remote wireless node end of the power bus, and each of the plurality of remote sensor modules having a capacitor between the power line and a switch, wherein the remote wireless node sequentially detects a resonant frequency resulting from switching each respective capacitor to ground, and determines a physical sequence of the plurality of remote sensor modules along the one-wire serial bus using the resonant frequencies.

9. The system of claim 8, further comprising a pipe positioned around the data bus and the power bus, the remote sensor modules attached to the pipe with a water-tight seal, a pipe cap sealing a bottom of the pipe, and a waterproof housing attached at a top of the pipe and positioned around the remote wireless node and a power supply, such that the remote sensor assembly, the pipe, the pipe cap and the waterproof housing are deployable in a stream with the remote sensor modules in the stream and the remote wireless node is held above the stream by the pipe for transmitting data to the master wireless node.

10. The system of claim 3, wherein the one-wire serial bus is integrated into a watchband-like element, wherein the remote wireless node and a power supply are included in a wristwatch-like element attached to the watchband-like element, and wherein the plurality of remote sensor modules are interchangeably attached to the watchband-like element.

11. A method for collecting data comprising:
polling a plurality of wired sensors connected to each other via a data bus to obtain data representing a sensed condition at each of the plurality of wired sensors;
periodically sending the data to a central data collection device via a wireless connection;
determining a unique serial number for each of the plurality of wired sensors; and
periodically determining if any new wired sensors have been added to said plurality of wired sensors connected to the data bus.

12. The method of claim 11, wherein each of the plurality of wired sensors includes a local memory containing operating information, further comprising retrieving the operating information from the local memory of each of the plurality of wired sensors.

13. The method of claim 11, further comprising retrieving operating information for each of the plurality of wired sensors from a database using the unique serial number for each of the plurality of wired sensors.

14. The method of claim 13, wherein the database is a remote database, further comprising retrieving the operating information from the remote database and storing the operating information in a local database.

15. A method for collecting data comprising:
polling a plurality of wired sensors connected to each other via a data bus to obtain data representing a sensed condition at each of the plurality of wired sensors; and
periodically sending the data to a central data collection device via a wireless connection;
wherein the data bus is a one-wire serial bus, wherein a power line and a ground line form a power bus parallel to the one-wire serial bus, wherein each of the plurality of wired sensors is interchangeably connected to the one-wire serial bus and the power bus at respective spaced sensor attachment points, wherein the power line has an inductor between each of the sensor attachment points, and wherein a powered oscillator base circuit is in contact with the power line near a remote wireless node end of the power bus, the method further comprising determining a physical sequence of the plurality of wired sensors by sequentially detecting a resonant frequency resulting from switching a switch on each of said plurality of wired sensors to connect a capacitor between the power line and the ground line.

16. The method of claim 15, further comprising sending the physical sequence of each of the plurality of wired sensors to the central data collection device to enable mapping a location of each of the plurality of wired sensors in three-dimensions.

* * * * *